Patented Sept. 24, 1946

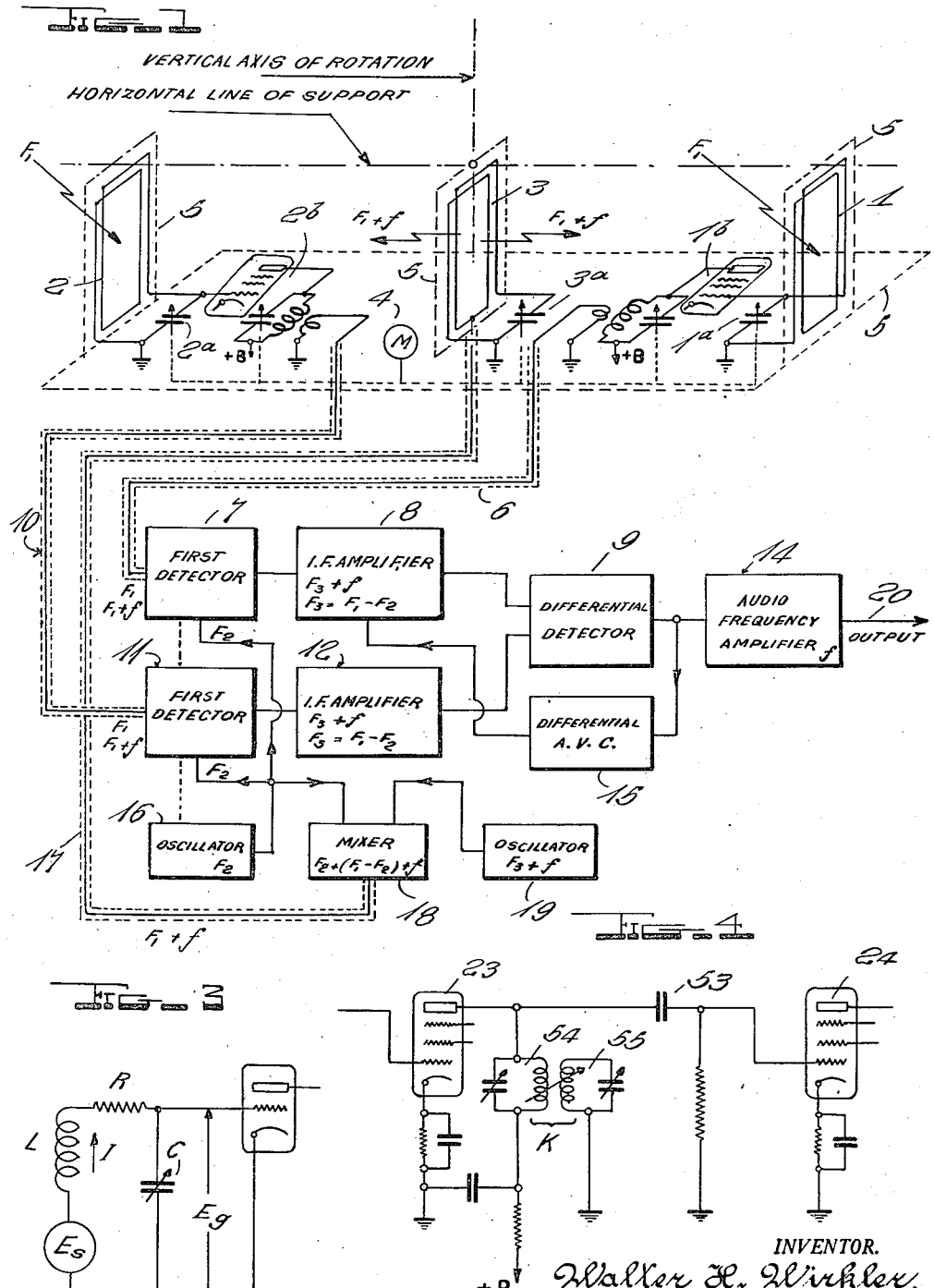

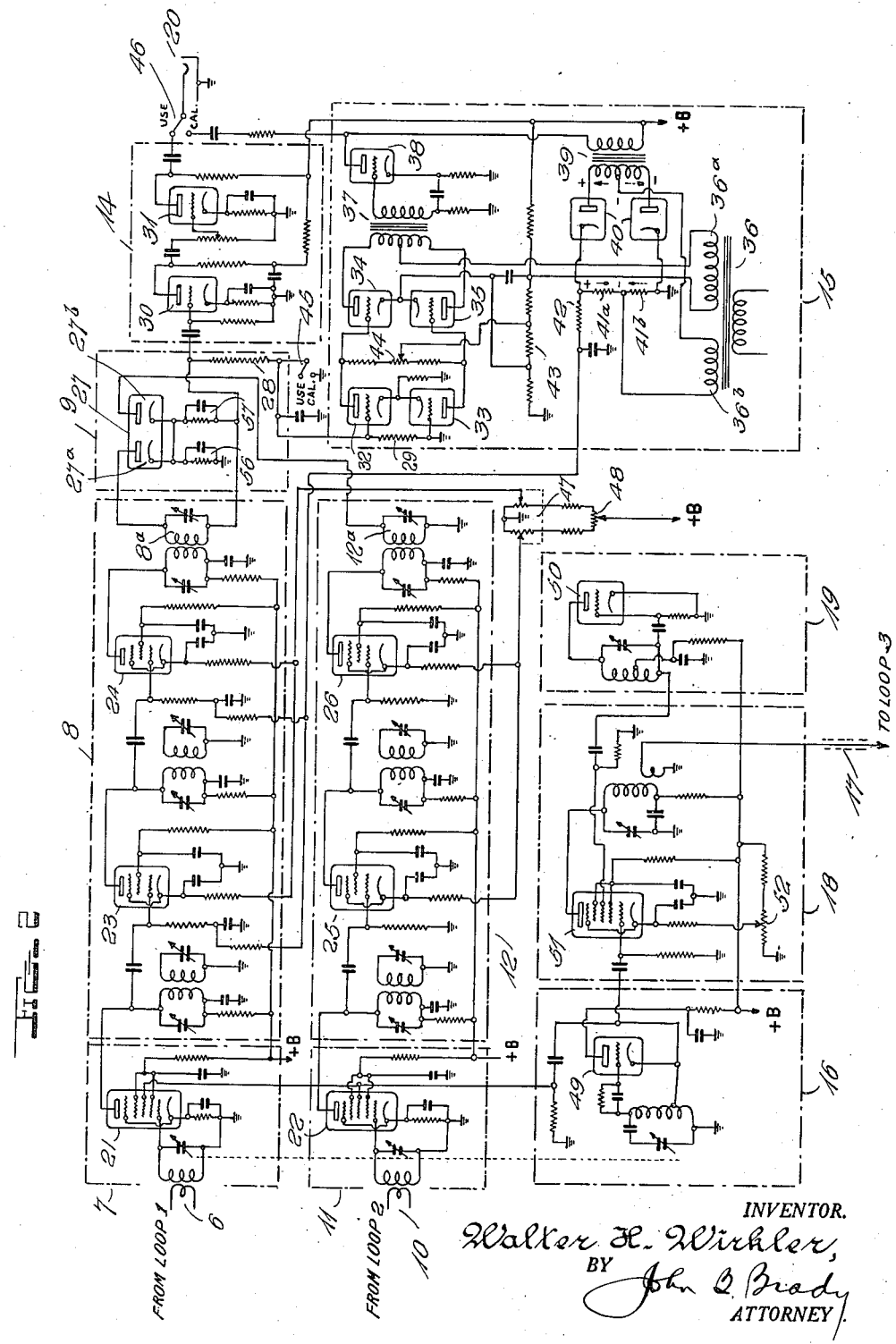

2,408,119

UNITED STATES PATENT OFFICE 2,408,119

HETERODYNE RADIO DIRECTION FINDING SYSTEM

Walter H. Wirkler, Cedar Rapids, Iowa, assignor to Collins Radio Company, Cedar Rapids, Iowa, a corporation of Iowa Application May 16, 1939, Serial No. 274,039

8 Claims. (Cl. 250—11)

My invention is directed broadly to radio direction finding systems and more particularly to a method and circuit arrangement for determining the relative direction of propagation of signal energy received by a comparison of the phase relations of audio frequency currents.

One of the objects of my invention is to provide a method of interpreting the phase relation of radio frequency energy received at spacially related points by converting the radio frequency energy to audio frequency energy while preserving the significant phase relation of the currents.

Another object of my invention is to provide means for altering the frequency of radio signal energy in a direction finding system without changing the relative phase thereof with respect to a different component of the energy similarly altered.

Still another object of my invention is to provide a rotatable antenna arrangement in a direction finding system employing separate receiving circuits connected with certain antennas and local oscillator means connected to energize another of the antennas, with means for tuning the various antenna circuits.

A further object of my invention is to provide a receiving system in cooperation with the rotatable antenna arrangement including the separate receiving circuits and a differential circuit in common thereto for deriving the required directional signal.

A still further object of my invention is to provide an automatic gain control circuit effective in operation upon one of the signal receiving circuits to maintain a balance of amplification in the separate circuits.

Another object of my invention is to provide high frequency coupling means in the separate receiving circuits effective to transfer the high frequency energy selectively with a minimum of phase displacement of low frequency modulation energy.

Still another object of my invention is to provide a radio direction finding system employing a locally energized antenna circuit and superheterodyne receiving circuits coupled with separate antenna components, with a common oscillator supplying the conversion energy to the superheterodyne receiving circuits and being employed in energizing the locally energized antenna circuit.

Other and further objects of my invention reside in the system and the representative embodiment thereof hereinafter more fully described with reference to the accompanying drawings, in which:

Figure 1 is a diagram illustrating the general arrangement of the elements of my invention; Fig. 2 is a schematic diagram of the circuit arrangement represented in diagrammatic block form in Fig. 1; Fig. 3 is an equivalent circuit schematic diagram of the tuned loop circuits employed in the system of my invention; and Fig. 4 is a detailed schematic diagram of the high frequency coupling circuit embodied in the circuit arrangement of Fig. 2.

Considerable information is available regarding the effects of time, frequency, and distance, on such propagation phenomena as variation in apparent bearing, scattering effects caused by simultaneous arrival of signals from more than one direction, and change in polarization, in direction finding systems. These factors are, for the most part, beyond the control of the receiving operator. My invention concerns a direction finding system which will give an accurate indication of apparent bearing, and while it is recognized that this result cannot be achieved in the presence of scattering effects, it will be shown that operation is not affected by polarization or vertical angle of arrival.

Any direction finder may be said to depend for its indication on a comparison of the radio frequency time-phase of voltages induced in different parts of the antenna system, horizontally spaced from each other. This is accomplished quite simply in the loop antenna in which the two vertical sides of a square loop, constitute the horizontally spaced elements. When a loop antenna is electrostatically balanced or shielded to eliminate the ordinary antenna effect, it serves as a very simple and reliable direction finder for such signals as induce no voltage in its horizontal member. The reason for the simplicity of the loop direction finder is that the two vertical coil sides, whose induced voltages are under comparison, are included in the same tuned circuit; and, at least when the wavelength is long as compared to the dimensions of the loop, the circuit treats these two voltages exactly alike and a sharp null reading is possible.

Since, at high frequencies, conditions of polarization and vertical angle of arrival of the receiving wave are seldom such that no voltage is induced in the horizontal members, it is seen that, as soon as the horizontal members are taken into consideration, the loop cannot be split into two parts which pick up the same voltage under all conditions of polarization. Instead, it is necessary to use two or more antennas which are identical in their horizontal as well as their vertical portions, or to eliminate the horizontal portions entirely.

One scheme sometimes proposed is to compare the voltage of two identical horizontally spaced loop antennas. While this would, in theory, produce the required results, it must be remembered that the effective height of a loop antenna is but a small fraction of the height of one of its sides and that considerable spacing is required between the two loops if reasonable sensitivity is to be attained. It then becomes electrically impractical to include the two loops in the same tuned circuit. Any arrangement in which the loops are tuned separately and the two currents compared directly in an intermediate circuit, would require so high a degree of identity between the two circuits as to be quite hopeless.

Practical direction finders have generally been of the Adcock type in which the antennas are entirely vertical and untuned up to the point at which they are connected together for comparison or cancellation of voltages. The relatively inefficient tuning and coupling means necessary are compensated for by increasing the height and spacing of the vertical elements as compared to those of the loop antenna.

Effective Adcock direction finders have been built with either stationary or rotatable antenna systems. In the stationary type, some form of goniometer is used to compare the phase of radio frequency currents received from several vertical antennas. The inefficient power transfer of the goniometer is compensated for by the use of relatively high, widely spaced antennas. This requires a considerable area of uniform ground or ground screen and, in addition, the antennas and connecting radio frequency transmission lines and coupling systems must be maintained identical in operation over the frequency range and under conditions of temperature and mechanical strain encountered in service. The goniometer must, of course, function properly over the required frequency range. In addition, the typical stationary Adcock direction finder with four elements spaced at the corners of a square with a fifth in the center for sense direction has an inherent octant error dependent on the frequency, the spacing, and the direction of arrival of the wave front.

The two element rotatable Adcock direction finder, because it dispenses with the goniometer, can be made with a more effective tuning and coupling system so that it need not be as large physically as the stationary type. It can be erected fairly rapidly and does not require excessive space. Also, the octant error is eliminated. The rotatable type has the disadvantages of being rather slow and cumbersome to handle. Furthermore, as the horizontal interconnecting leads must be above the earth, the antennas must be of the balanced type so as to balance out the horizontally induced voltages. This requires a rather high degree of balance in capacity to ground of the two vertical halves of each antenna to prevent voltages along the horizontal connecting arm from getting into the antenna circuit. This balance is not quite independent of frequency and makes it necessary to erect the device at a considerable height above ground. Uniform earth and, preferably, a ground screen immediately beneath the antenna are also desirable for an electrostatic balance. The antennas have an electrostatic field of considerable extent, and movement of personnel in the immediate vicinity of the antenna must be properly guarded against. In addition, of course, the rotatable Adcock antenna must fulfill all of the requirements of the stationary type as regards shielding and balanced construction to eliminate antenna effects, spurious pick-up, and inequality of the two vertical antennas and interconnecting leads. In particular, if it is desirable to tune the system above the static screen, that is, on the primary side of the coupling transformer in order to increase the sensitivity, it is important that the tuning equipment be very symmetrical to avoid any unbalancing effect.

My invention relates to a substantially different system of direction finding, one which greatly simplifies the construction and balance requirements in the antenna system and radio frequency circuits. A heterodyning voltage, differing by a low audio frequency from the received signal frequency, is generated by a local oscillator and induced from a centrally located "injector" antenna into each of the other antennas of the receiving system. Each receiving antenna is connected to a separate receiver. The output of each receiver then contains an audio frequency heterodyne tone. If the injection voltage induced into each antenna is of the same radio frequency time-phase—as it will be when the injector antenna is centrally located—it can be shown that the phase relations of the audio tones at the outputs of the receivers are the same as those between the voltages induced by the signal wave into the different antennas.

Let $\omega = 2\pi$ times the signal frequency,
$\rho = 2\pi$ times the heterodyne frequency, and
$\theta =$ phase angle of received signal.

The locally injected voltage may be written $$E_0 = \cos(\omega - \rho)t$$

and the voltage induced by the signal $$E_s = \cos(\omega t + \theta)$$

Combining these two waves in a square law detector $$(E_0 + E_s)^2 = \cos^2(\omega - \rho)t + 2\cos(\omega t - \rho t)\cos(\omega t + \theta) + \cos^2(\omega t + \theta) = \tfrac{1}{2} + \tfrac{1}{2}\cos 2(\omega - \rho)t + \cos(2\omega t - \rho t + \theta) + \cos(\rho t + \theta) + \tfrac{1}{2} + \tfrac{1}{2}\cos 2(\omega t + \theta)$$

where the term $\cos(\rho t + \theta)$ is the audio frequency term, showing that the phase angle $\theta$ has been preserved. The indication of the direction finder is then based on a comparison of audio frequency phase relations, rather than on radio frequency phase relations. As a result, the necessity of precise equality of the high frequency and antenna circuits is greatly reduced.

In my copending application, Serial No. 256,339, filed February 14, 1939, for Azimuth radio direction finding system, I have disclosed a stationary antenna system and receiving circuits adapted to operate calibrated instrument means for providing visual azimuth directional indications. My invention described herein relates to a rotatable antenna system with receiving circuits operative to indicate a null position in the reception of signal energy by which the direction of incidence of the wave front can be determined from the position of the antenna.

Referring to Fig. 1, two similar loop antennas 1 and 2 are mounted at the ends of a horizontal supporting arm of suitable length pivoted on a vertical axis at its center, as indicated on Fig. 1. Each loop is of the unbalanced type, tuned by a variable condenser 1a, 2a, respectively, and connected directly to the grid of a tuned radio frequency amplifier 1b, 2b, respectively. Balanced loops may be employed, with somewhat superior results. A third loop antenna 3, tuned by condenser 3a, is mounted midway between the antennas 1 and 2 and serves as the injector antenna. The three loop antennas are in parallel planes, as indicated, and are at right angles to the horizontal line of support. The variable condensers 1a, 2a and 3a, tuning the loop antennas, and the condensers tuning the radio frequency amplifiers 1b and 2b are ganged together and rotated by a small motor 4 over the frequency range of the system. Each loop antenna is enclosed by electrostatic shielding means, and the high frequency circuits described are likewise shielded, as indicated generally at 5.

The output of each radio frequency amplifier is fed to an individual receiving circuit through a shielded transmission line. Thus, the output of amplifier 1b is fed through shielded line 6 to the receiving circuit including first detector means 7 and intermediate frequency amplifier 8 connected to a second detector 9 of differential character. Similarly, amplifier 2b connects through line 10 to detector 11, thence through intermediate frequency amplifier 12 to the differential detector 9. The output of the detector 9 is supplied to audio frequency amplifier 14, and part of the output is diverted through differential automatic gain control means 15 effective on the intermediate frequency amplifier 8. The receivers are of the superheterodyne type and are supplied with energy for frequency conversion from the one oscillator 16.

The injector loop 3 is energized through shielded transmission line 17 from a mixer circuit 18 supplied with energy from both oscillator 16 and a separate oscillator 19 operating at a frequency differing from the intermediate frequency of amplification in amplifiers 8 and 12 by a few hundred cycles to provide ultimately an audible note in the output of detector 9 and amplifier 14. Tuning means in the receivers 7 and 11 are ganged together and tracked with the tuning means of the conversion oscillator 16 which is common to the two receivers; the frequency of oscillator 19 is fixed, which thus determines the frequency of the injected voltage $F_1+f$ which is sufficiently close to the signal frequency to produce an audible beat frequency.

In operation, then, the heterodyning frequency is supplied to the injector loop antenna 3 and induced in the receiving loop antennas 1 and 2 together with the received signal. When the antenna system is turned perpendicular to the plane of incidence of the arriving wave, the loops are each in a position for maximum signal detection, and the voltage induced in loop 1 is in phase with that in loop 2. The audio beat note in the output of receiver 7, 8, 9, is also in phase with that from receiver 11, 12, 9, and a sharp null will be obtained in the output of audio amplifier 14 because the beat frequency energy from the separate receivers is differentially related in the detector 9. The differential automatic volume control 15 functions under proper conditions, as will be described, to assure equal gain in the separate receivers to obtain accurate differential results in the output of detector 9.

This direction finder has the same property as the Adcock in that the two receiving antennas are identical, and that when they are on a line perpendicular to the plane of arrival of the signals, a null indication is obtained independent of wave polarization. That is, even though a voltage be induced in the horizontal members of loop 1, it will be induced in the horizontal members of loop 2 in the same sense. The advantage of this antenna system over the rotatable Adcock lies in the use of shielded loop antennas rather than electrostatically balanced vertical antennas. Horizontal voltages induced in the supporting arm itself are prevented from entering the antenna circuits by the electrostatic shields rather than by any form of balancing. As a result, the rotating structure need be only a few feet above ground and is considerably less cumbersome than the rotatable Adcock.

Small inequalities between the two antennas and radio frequency transmission lines have comparatively little effect on the accuracy of the system, that is, instrument errors are caused only by inequalities in the audio frequency phase shift of the beat note between the antennas and the second detectors of the receivers. When the structure is rotated so that the signal induces voltages of like phase in the two loops, it is not essential that the radio frequency phase shifts between antenna and receiver be equal on the two sides, but rather that the difference in phase shift between the signal voltage and the locally introduced heterodyning voltage be equal on the two sides of the system. Since the heterodyning voltage differs in frequency from the signal frequency by only a small fraction of one percent, this requirement is not prohibitively severe, especially in the antenna system. This can be shown by considering the equivalent circuit of the antenna system and determining the effect of a change in frequency on the phase shift produced in the system; Fig. 3 gives the equivalent circuit of one of the tuned loop antenna systems 1—1a or 2—2a.

In Fig. 3, $E_s$ represents the induced signal voltage; $E_g$, the voltage at the grid of the radio frequency amplifier; L, the inductance of the loop; R, the resistance of the loop; and C, the capacity of the loop tuning condenser.

Let $\omega=2\pi$ times the radio frequency
$\omega_0=2\pi$ times the frequency at which $$\omega L = \frac{1}{\omega C}$$

When $\omega=\omega_0$, the current I will be in phase with $E_s$, and $E_g$ will be 90 degrees out of phase with $E_s$. This represents a condition of normal phase shift. We are interested in how $\phi$, the angle of departure from this normal phase shift, varies with frequency, so that we may determine the difference in phase shift between the signal voltage $E_s$ and the heterodyning voltage $E_0$. We have $$\tan \phi = \frac{\omega L - \frac{1}{\omega C}}{R} = \frac{\omega_0 L}{R}\left[\frac{\omega}{\omega_0} - \frac{1}{\omega \omega_0 L C}\right]$$

and since $$\omega_0^2 = \frac{1}{LC}$$

$$\tan \phi = \frac{\omega_0 L}{R}\left[\frac{\omega}{\omega_0} - \frac{\omega_0}{\omega}\right]$$

or $$\tan \phi = Q\left[n - \frac{1}{n}\right]$$

where $$n = \frac{\omega}{\omega_0} \text{ and } Q = \frac{\omega_0 L}{R}$$

Letting $\tan \phi = y$ $$y = Q\left[n - \frac{1}{n}\right]$$

$$\frac{dy}{dn} = Q\left[1 + \frac{1}{n^2}\right]$$

$$\frac{d\phi}{dn} = \frac{\frac{dy}{dn}}{1 + y^2} = \frac{Q\left(1 + \frac{1}{n^2}\right)}{1 + Q^2\left(n - \frac{1}{n}\right)^2} = \frac{Q(n^2 + 1)}{n^2 + Q^2(n^2 - 1)^2}$$

Now letting $n = 1 + \Delta$, where $$\Delta = \frac{\omega - \omega_0}{\omega_0} = \frac{f - f_0}{f_0}$$

and, since $\Delta$ is small, neglecting $\Delta$ as a single term, we have $$\frac{d\phi}{dn} = \frac{2Q}{1 + 4Q^2\Delta^2}, \text{ approximately}$$

Supposing, now, the carrier frequency is 3000 kc., the heterodyne frequency 300 c. p. s., and the Q of the loop is 50. If the loop is resonant, $\Delta = 0$, and the slope of the phase shift characteristic is $$d\phi = \frac{(2)(50)}{1 + 0} dn$$

$$dn = \frac{300}{3,000,000} = 0.0001$$

$d\phi = 100 \times 0.0001 = 0.01$ radians $= 0.573$ degrees phase shift for a 300 cycle tone.

Now supposing the other loop, instead of being tuned to resonance is, by reason of circuit inequalities, tuned one-half of one percent from resonance.

$$\Delta = 0.005$$

$$\frac{d\phi}{dn} = \frac{(2)(50)}{1 + (2 \times 50 \times 0.005)^2} = \frac{100}{1.25} = 80$$

$d\phi = 80 dn = (80)(0.0001) = 0.008$ radians
$\quad\quad\quad\quad\quad\quad\quad\quad\quad = 0.458$ degrees The difference in audio frequency phase shift is then $$\begin{aligned} 0.573 \\ -0.458 \\ \hline = 0.115 \text{ electrical degrees} \end{aligned}$$

With a spacing of the two loops of five meters and the wave-length of the received signal 100 meters, the electrical phase difference between the signal voltages induced in the two loops when the arm is turned one degree from the null position is $$\frac{5 \text{ meters}}{100 \text{ meters}} \times 360° \times \sin 1° = 0.315 \text{ degrees}$$

The error in bearing produced is therefore $$\frac{0.115}{0.315} = 0.365 \text{ degrees}$$

for a circuit with a Q of 50, one-half of one percent detuning, and an audio frequency of 300 c. p. s., and at a wave-length of 100 meters, with loops spaced 5 meters.

This error increases with Q and with the audio frequency, and decreases with the radio frequency and with the spacing of the antennas. It is evident that the error in this respect arising in the intermediate frequency amplifier tuned circuits of the receiver is greater because of higher Q and lower carrier frequency. The problem is made considerably simpler, however, by the use of the common superheterodyne oscillator 16 for the two receivers, whereby the intermediate frequency is exactly the same in each receiver. The intermediate frequency circuits are aligned quite closely with each other, and comparatively few stages are used in cascade while coils of extremely high Q are avoided.

The complete circuit arrangement included in the block diagram of Fig. 1 is shown schematically in Fig. 2, wherein the blocks are shown in broken line outline and designated by like reference characters. The first detector circuits 7 and 11 are of conventional design employing multigrid electron tubes 21 and 22, respectively. Each of the intermediate frequency amplifiers 8 and 12 includes two stages of electron tube amplification with novel coupling means shown in detail in Fig. 4 and hereinafter more fully described. Amplifier 8 includes electron tubes 23 and 24; and amplifier 12, tubes 25 and 26. The second detector 9 comprises a dual diode electron tube 27 serving as two independent second detectors with the diode portion 27a connected with the output means 8a of amplifier 8 and diode portion 27b connected with output means 12a of amplifier 12. The rectified voltages from the different diode portions are applied in series opposition across resistors 28 and 29 in the output of the detector, and by-pass resistor-condenser combinations 56 and 57 are provided; by-pass combination 56 completing the circuit from rectifier portion 27a to ground, and by-pass combination 57 completing the circuit from rectifier 27b to resistor 28. The differential voltage across resistor 28 is impressed on the input of amplifier 14 which, as shown, is a conventional two stage resistance coupled audio frequency circuit employing electron tubes 30 and 31; the output at 20 includes a jack for connection to audio signal indicating means.

The portion of the differential voltage due to the direct current in resistor 29 is applied directly to the grid of electron tube 32. A compensating tube 33 has the grid thereof grounded with the end of the resistor 29 opposite from the connection to the grid of tube 32, so that changes in power supply voltage do not affect the difference in the grid potentials applied to amplifier tubes 34 and 35 which are energized from the output of tubes 32 and 33 in opposite relation. The plates of tubes 34 and 35 receive alternating current in balanced relation, from secondary 36a on power transformer 36, through a center tap on the output transformer 37. Unbalance in the grid voltages of tubes 34 and 35 results in some alternating current voltage being delivered through transformer 37 to the grid of an amplifier 38. This alternating current is applied to transformer 39 and therethrough, in opposition, to the plates of a balanced rectifier 40. Simultaneously, alternating current from secondary 36b on power transformer 36 is applied to the balanced rectifier 40 in parallel. Resistors 41a and 41b connected in branch circuits from the secondary 36b to the cathodes of the balanced rectifier will carry current separately according to which bank of the balanced rectifier is conductive, which depends upon the relative polarity of the alternating current in transformer 39, as determined by which tube, 34 or 35, is more conductive. Accordingly, resistor 42 will have a voltage of polarity dependent upon which receiving circuit introduces the more gain and of magnitude dependent upon the difference in gain, and this voltage is applied as an automatic gain control to the grids of tubes 23 and 24 in the amplifier 8 for the purpose of equalizing the gain. In operation, the automatic gain control tends to equalize the gain as the antenna system is rotated so that a sharp null may be noticed in the output 20 when substantially in phase signal voltages are induced in the loop antennas 1 and 2. In this condition voltages of equal magnitude are opposed in resistors 28 and 29 so that no signal is evident at the output 20 and, in the differential gain control, no unbalance exists on the grids of tubes 34 and 35. The grids of tubes 34 and 35 are supplied with bias potential from the voltage across a resistor 43 in circuit with the usual rectified power supply. Adjustment for balance is provided by potentiometer 44, for the adjustment of which switches 45 and 46 are provided to isolate the control 15 and to connect the audio indicating means at output 20 with amplifier 38, respectively. When the circuit is so arranged, potentiometer 44 is adjusted until no alternating current is present in the output.

The gain of the amplifiers 8 and 12 may be manually controlled by a ganged resistance arrangement as shown at 47 controlling the cathode potential in tubes 23—26. Equality of gain is manually adjusted by potentiometer 48 in conjunction with the ganged control 47.

The oscillator circuits 16 and 19 may be of any suitable construction, preferably of the electron tube type shown. Triodes 49 and 50 are shown in oscillators 16 and 19, respectively, with the tuned circuit of oscillator 16 ganged with the tuning controls of detectors 7 and 11 as hereinbefore noted. The mixer circuit 18 is of conventional design employing multi-grid tube 51 and including control means at 52 for regulating the power supplied to loop 3. The output of mixer 18 is unmodulated.

Referring now to Fig. 4, tubes 23 and 24 in amplifier 8, for example, are coupled by a connection from the anode of tube 23 through a condenser 53 to the control grid of tube 24, thus providing a high frequency path subject to minimum phase complications in respect to the heterodyne tone modulation. Selectivity is provided by tuned circuit 54 connected in the anode-cathode circuit of tube 23. A parasitic circuit 55, variably coupled with tuned circuit 54, permits adjustment of the audio modulation phase by variation of the coupling between the circuits 54 and 55, where necessary. If the two tuned circuits, 54 and 55, have identical L, C, and Q, and a like coupling coefficient $$K = \frac{1}{Q}$$

the arrangement will have very little effect on the audio frequency modulation. Adjustment of the coupling, therefore, furnishes a convenient method for controlling the audio phase shift for the purpose of equalizing the operation of the separate receiving circuits in this respect.

A convenient check on possible errors in the system is furnished by changing the audio beat frequency slightly. After a sharp null has been obtained by turning the antenna system and adjusting the gain of one of the receivers, the frequency of oscillator, 19, Figs. 1 and 2, is changed slightly. As the audio phase shift is proportional to the audio frequency, a phase difference in the two beat notes will appear if there is any inequality in the system, and a new directional setting will be necessary to reestablish the null. If the null remains when the beat frequency is changed, however, the setting is correct. Oscillator 19 may be frequency modulated over a range of about 200 cycles by means of a small motor-driven condenser so that the beat note changes continuously from approximately 200 to 400 cycles. An adjustment of the phase shift characteristic of one of the receivers may then be made manually while turning the direction finder, until no beat note is audible. This phase adjustment can be accomplished by adjusting the coupling of one of the intermediate frequency stages, as above described in relation to Fig. 4. Under these conditions, no instrument error due to maladjustment will exist, and the bearing obtained will be correct.

The advantage of the heterodyne direction finder of my invention over the known Adcock system is more pronounced for ultra-high frequencies. At a wavelength of five meters, for example, a rotatable structure with antennas four meters apart would be feasible. The phase tolerance requirements in the antenna system are greatly reduced, because the audio beat frequency is a very small fraction of the carrier frequency. The comparatively large tolerance of this system in the matter of equality of antennas and transmission lines is of real value at these high frequencies, and the difficulty of using comparatively large antennas spaced almost one wavelength apart is eliminated. Spacings of greater than one wavelength would, of course, result in ambiguity.

While I have disclosed my invention in certain preferred embodiments, I desire it understood that modifications may be made therein without departing from the principles of my invention as disclosed, and that no limitations upon my invention are intended except as are imposed by the scope of the appended claims.

What I claim as new and desire to secure by Letters Patent of the United States is as follows:

1. In a radio direction finding system, the method of determining the radio frequency time-phase of signal voltages induced in different parts of a directional antenna system which comprises supplying radio frequency energy locally in equal relation to the different parts of the antenna system for inducing therein second voltages of like phase characteristics, the frequency of said locally supplied energy being different from that of the signal energy in a relatively small degree, separately mixing the voltages induced in each part of the antenna system to obtain separate low frequency components the phase relation of which is the same as that of the signal voltages induced in the different parts of the antenna system, said low frequency being equal to the difference in frequency of the signal energy and the locally supplied energy, combining said low frequency components, and indicating the phase relation of said low frequency components as a function of the resultant derived from the combination of said components.

2. In a radio direction finding system, the method of determining the phase relation of radio frequency signal voltages induced in different parts of a directional antenna system which comprises supplying radio frequency energy locally in equal relation to the different parts of the antenna system for inducing therein second voltages of like phase characteristics, the frequency of said locally supplied energy being different from that of the signal energy in a relatively small degree, separately mixing the voltages induced in each part of the antenna system and a locally generated voltage to produce modulated intermediate frequency components the modulations of which are of a low frequency equal to the difference in frequency of the signal energy and the locally supplied energy and have the same phase relation as the signal voltages induced in the different parts of the antenna system, amplifying said intermediate frequency components with substantially no alteration in phase of the modulations, rectifying said intermediate frequency components, combining the low frequency modulations in the rectified components, and indicating the phase relation of said low frequency modulations as a function of the resultant derived from the combination of said modulations.

3. In a radio direction finding system, the method as set forth in claim 2 and including combination of said locally generated voltage and a second locally generated voltage of a frequency differing from the intermediate frequency by the low frequency of said modulations to provide the radio frequency energy supplied locally to the different parts of the antenna system.

4. A radio direction finding system comprising a pair of tuned loop receiving antennas mounted for rotation in diametrically opposite positions about a middle vertical axis and arranged in parallel planes, a tuned loop injector antenna mounted at said axis in fixed parallel relation with respect to said receiving loop antennas and spaced coupled invariably in like relation to both said receiving loop antennas, electrostatic shielding means for said loop antennas, means for electrically exciting said injector antenna with energy of frequency differing from that of received signal energy in a relatively small degree, separate receiving circuits connected with said tuned loop receiving antennas each including detector means for mixing the voltages induced in each of said receiving loop antennas by the signal energy and energy from said injector antenna for producing individual currents of low frequency equal to the difference in frequency in said voltages, the difference between the signal energy phase shift and the injection energy phase shift being substantially the same between each shielded receiving loop antenna and the respective receiving circuit, means connected in common with said receiving circuits for combining said low frequency currents, and means connected with the last said means for indicating the phase relation of said low frequency currents and accordingly the phase relation of the signal voltages induced in said receiving loop antennas as a function of the resultant current in the last said means.

5. A radio direction finding system as set forth in claim 4 and including intermediate frequency amplifiers in said separate receiving circuits, a conversion oscillator connected in common to said detector means, the outputs of said detectors being supplied to said intermediate frequency amplifiers, said low frequency currents being carried as modulations in said intermediate frequency amplifiers with the relative phase thereof substantially unchanged in the intermediate frequency amplifiers, and second detector means connected with said intermediate frequency amplifiers for delivering said low frequency currents.

6. A radio direction finding system as set forth in claim 4 with said receiving circuits also including a conversion oscillator connected in common to said detector means, separate intermediate frequency amplifiers connected with the outputs of said detector means, and separate second detector means connected with said amplifiers; and with said means for exciting said injector antenna including said conversion oscillator, an oscillator of a fixed frequency differing from the intermediate frequency by the low frequency of said individual currents, and a mixer circuit for deriving energy of the required frequency from both said oscillators for exciting said injector antenna.

7. A radio direction finding system as set forth in claim 4 with individual variable tuning means connected with said receiving loop antennas and said injector loop antenna, and means for simultaneously operating each of said tuning means for synchronously tuning all said antennas over a predetermined frequency range.

8. A radio direction finding system comprising a pair of receiving antennas mounted for rotation in diametrically opposite positions about a middle vertical axis, an injector antenna mounted at said axis and space coupled in like relation to both said receiving antennas, means for electrically exciting said injector antenna with energy of a frequency differing from that of received signal energy in a relatively small degree, separate receiving circuits connected with said receiving antennas each including detector means for mixing the voltages induced in each of said receiving antennas by the signal energy and energy from said injector antenna for producing individual currents of low frequency equal to the difference in frequency in said voltages, means connected in common with said receiving circuits for combining said low frequency currents in differential relation, gain control means energized by the resulting differential of the individual low frequency currents in said combining means and operatively related to one of said receiving circuits for substantially equalizing the amplitudes of said individual currents, and means connected with said combining means and energized by the resultant current for indicating the phase relation of said low frequency currents of substantially equal amplitude, and accordingly the phase relation of the signal voltages induced in said receiving loop antennas, as a function of said resultant current.

WALTER H. WIRKLER.